(12) United States Patent
Libis (10) Patent No.: US 9,943,713 B2
(45) Date of Patent: Apr. 17, 2018

(54) METHOD FOR STORING A RESPIRATORY MASK AND RESPIRATORY EQUIPMENT INCLUDING A RESPIRATORY MASK AND A STORAGE ELEMENT

(75) Inventor: Jean-Paul Libis, Bièvres (FR)

(73) Assignee: Zodiac Aerotechnics, Plaisir (FR)

( * ) Notice: Subject to any disclaimer, the term of this patent is extended or adjusted under 35 U.S.C. 154(b) by 505 days.

(21) Appl. No.: 14/355,007

(22) PCT Filed: Oct. 31, 2011

(86) PCT No.: PCT/IB2011/003300
§ 371 (c)(1),
(2), (4) Date: Apr. 29, 2014

(87) PCT Pub. No.: WO2013/064856
PCT Pub. Date: May 10, 2013

(65) Prior Publication Data
US 2014/0290665 A1    Oct. 2, 2014

(51) Int. Cl.
*A62B 25/00*    (2006.01)
*A62B 7/14*    (2006.01)
(Continued)

(52) U.S. Cl.
CPC .............. *A62B 25/005* (2013.01); *A62B 7/14* (2013.01); *A62B 18/02* (2013.01); *A62B 18/084* (2013.01); *B64D 10/00* (2013.01)

(58) Field of Classification Search
CPC ......... A62B 25/005; A62B 7/14; A62B 18/02; A62B 18/084; B65D 81/24; B65D 85/18
(Continued)

(56) References Cited

U.S. PATENT DOCUMENTS 3,599,636 A    8/1971    Gutman et al.
4,595,003 A *  6/1986    Shoemaker ............ A62B 18/02
                                                    128/201.19
(Continued)

FOREIGN PATENT DOCUMENTS

GB    775911    5/1957
GB    826198    12/1959
(Continued)

OTHER PUBLICATIONS

International Search Report dated Jul. 16, 2012 in Application No. PCT/IB2011/003300.
(Continued)

*Primary Examiner* — (Jackie) Tan-Uyen T Ho
*Assistant Examiner* — Margaret Luarca
(74) *Attorney, Agent, or Firm* — Kilpatrick Townsend & Stockton LLP; Dean W. Russell (57) ABSTRACT

Embodiments provide methods for storing a respiratory mask. In one embodiment, the respiratory equipment may include a respiratory mask having a front side and a rear side and a cavity having an opening in the rear side. There may also be provided an inflatable harness adapted to maintain the respiratory mask against the user face, and a storage element comprising a housing In one embodiment, the method may include pulling on the harness on the front side of the respiratory mask in order to place the harness on the respiratory mask in an storage position outside said cavity, and maintaining the harness on the respiratory mask in the storage position and inserting the respiratory mask into the housing of the storage element.

16 Claims, 7 Drawing Sheets

(51) Int. Cl.
  *B64D 10/00* (2006.01)
  *A62B 18/02* (2006.01)
  *A62B 18/08* (2006.01)

(58) Field of Classification Search
  USPC .............. 128/206.27; 206/363, 370, 438, 388
  See application file for complete search history.

(56) References Cited

U.S. PATENT DOCUMENTS

| | | | |
|---|---|---|---|
| 4,664,108 A * | 5/1987 | Ansite | ................... A62B 18/084 |
| | | | 128/202.26 |
| 5,036,846 A | 8/1991 | Aulgur et al. | |
| 5,488,948 A | 2/1996 | Dubruille et al. | |
| 5,771,886 A | 6/1998 | Maire et al. | |
| 5,954,052 A | 9/1999 | McDonald et al. | |
| 5,957,132 A | 9/1999 | McDonald et al. | |
| 2005/0263156 A1* | 12/2005 | Westphal | ............... B64D 25/00 |
| | | | 128/205.25 |
| 2007/0193585 A1 | 8/2007 | McDonald et al. | |
| 2013/0220329 A1* | 8/2013 | Gredat | ................. A62B 18/084 |
| | | | 128/205.25 |

FOREIGN PATENT DOCUMENTS

| | | |
|---|---|---|
| GB | 1097337 | 1/1968 |
| GB | 2454491 A | 5/2009 |
| WO | 199401178 | 1/1994 |
| WO | 199920349 | 4/1999 |
| WO | 199958197 | 11/1999 |
| WO | 2008017630 | 2/2008 |
| WO | 2008097528 A1 | 8/2008 |
| WO | 2009087488 A1 | 7/2009 |

OTHER PUBLICATIONS

International Search Report dated Aug. 1, 2008 in Application No. PCT/IB2008/051263.

* cited by examiner

METHOD FOR STORING A RESPIRATORY MASK AND RESPIRATORY EQUIPMENT INCLUDING A RESPIRATORY MASK AND A STORAGE ELEMENT

CROSS REFERENCE TO RELATED APPLICATIONS

This application is the U.S. national phase of International Application No. PCT/IB2011/003300 filed on Oct. 31, 2011, and published in English by the World Intellectual Property Organization on May 10, 2013 as International Publication No. WO 2013/064856 A1, the contents of which are incorporated herein by reference.

FIELD OF THE INVENTION

The invention relates to a method for storing a respiratory mask and to a respiratory equipment for aircraft, said respiratory equipment including a respiratory mask, an inflatable harness and a storing element.

BACKGROUND OF THE INVENTION

In particular, the invention deals with a method which comprises:
  a) providing a respiratory equipment including:
    a respiratory mask having a front side and a rear side (at the opposite of the front side), the respiratory mask comprising a cavity having an opening in the rear side, the rear side of the respiratory mask being adapted to be applied on a user face in a use position in which the user face closes the opening of the cavity,
    an inflatable harness adapted to maintain the respiratory mask against the user face, and
    a storage element comprising a housing adapted to store the respiratory mask in a storage position,
  inserting the respiratory mask into the storage element so as to place the respiratory mask at a storage place of the storage element.

The respiratory mask typically worn by aircraft crewmembers must be attached surely and rapidly on the crewmember head. And it must require only one hand to be attached; since the other hand of the user is frequently required for some other essential tasks.

For example, if because of a pressurization failure, the pilot of an aircraft is required to rapidly don his respiratory mask to provide him with the necessary oxygen for breathing, he often must do so with one hand while his other hand is occupied in controlling the aircraft. Thus, the use of an inflatable head harness has been suggested in order to enable the respiratory mask to be donned using only one hand. Generally, the head harness has substantially a dome shape or an annular shape and is expanded diametrically by the introduction of pressurized gas to cause the harness to increase in size so that it can be positioned over the head of the user. The gas flow is controlled by a valve attached to the respiratory mask, and, after enlargement of the harness, the respiratory mask is placed in position against the face of the user, with the harness extended over and spaced from the back of the head. Once the respiratory mask is properly positioned, the pressure in the harness is released, causing the harness to contract and to contact the head of the pilot, whereby the respiratory mask is securely held in its proper position. Meanwhile, the other hand of the pilot is free to control the aircraft or to perform such other tasks as may be required.

SUMMARY OF THE INVENTION

The invention aims at improving the efficiency of the respiratory mask donning and in particular reducing the time of inflation of the inflatable harness.

For this purpose, according to the invention the method for storing the respiratory mask further comprises:
  b) pulling on the harness on the front side of the respiratory mask in order to place the harness on the respiratory mask in an storage position outside said cavity, and
  c) maintaining the harness on the respiratory mask in the storage position and inserting the respiratory mask into the housing of the storage element, so as to place the respiratory mask at a storage place of the storage element.

In the storage position, the harness is pulled which tends to extend the harness and avoids that the harness have a bend. The harness is maintained substantially in the storage position when the respiratory mask is stored in the storage element. Therefore, the harness is outside the cavity of the respiratory mask when it is in the storage element. When the respiratory mask has come out of the housing, the harness is outside the cavity of the respiratory mask and the harness 20 can be inflated. So, the risk of having a bend of the harness inserted in the cavity of the respiratory mask when the harness begins to inflate is reduced, as long as the occurrence of inflation problem increasing the time required for inflating the harness.

According to another feature in accordance with the invention, preferably the method comprises:
  providing the respiratory mask with a top edge and a bottom edge around the cavity, the top edge being opposite the top edge, and
  placing an upper resting portion of the harness against the top edge of the respiratory mask in the storage position during step b).

Thus, the harness is more easily maintained in the storage position and the subsequent inflation of the harness is quicker.

According to a supplementary feature in accordance with the invention, the method preferably comprises maintaining the resting portion of the harness between the top edge of the respiratory mask and a wall of the housing of the storage element when the respiratory mask is at the storage place.

Thus, the harness is more surely maintained in the storage position when the respiratory mask is at the storage place.

According to another supplementary feature in accordance with the invention, the method preferably comprises placing a lower resting portion of the harness against the bottom edge of the respiratory mask and exerting a tension on the harness between the upper resting portion and the lower resting portion in the storage position of the respiratory mask.

Thus, the harness is even more easily maintained in the storage position and the subsequent inflation of the harness is quicker.

According to another supplementary feature in accordance with the invention, the method preferably comprises pulling on a connection portion of the harness away from the cavity on the back side of the respiratory mask, and then in a substantially circular movement pulling on the connection portion of the harness successively:

above the top edge, and
on the front side of the respiratory mask, so as to place the upper resting portion of the harness against the top edge of the respiratory mask.

Thus, the harness is efficiently placed in a satisfying storage position on the respiratory mask.

According to another feature in accordance with the invention, the method preferably comprises:
providing the respiratory equipment with a strap having a catching portion and a connection portion, said connection portion of the strap being connected to the harness,
pulling on the catching portion of the strap during step b), and
releasing the strap after inserting the respiratory mask into the storage element and placing the respiratory mask in the storage place of the storage element.

Thus, step b) is easier to achieve.

According to a supplementary feature in accordance with the invention, the method preferably comprises:
providing the respiratory mask with a support supporting the respiratory mask, and
during step c) gripping the support (for inserting respiratory mask into the storage element) and catching the catching portion of the strap (for maintaining the harness in the storage position) with a single hand.

Thus, placing the respiratory mask at the storage place while pulling on the strap is made easier, since only one hand is required.

According to another supplementary feature in accordance with the invention, the method preferably comprises fixing the respiratory mask at the storage place before releasing the strap.

Thus, the harness is more surely maintained in the storage position.

According to another supplementary feature in accordance with the invention, the strap is preferably elastically stretchable.

Thus, it is easier to exert a pulling tension on the harness.

According to another supplementary feature in accordance with the invention, the method preferably comprises:
providing the harness with an inflatable tube having two ends connected to the respiratory mask and forming an harness loop intended to surround the head of the user, and
connecting the connection portion of the strap to the inflatable tube substantially in the middle of the inflatable tube between the first end and the second end.

Thus, a substantially equal pulling tension can be easily exerted over the whole inflatable tube.

According to supplementary feature in accordance with the invention, the method preferably comprises:
providing the harness with a second inflatable tube having two ends connected to the respiratory mask and forming a second harness loop intended to surround the head of the user,
connecting a second connection portion of the strap to the second inflatable tube substantially in the middle of the second inflatable tube between the first end and the second end, and
simultaneously pulling on the inflatable tube and the second inflatable tube during step b).

Thus, the harness is more safely maintained on the user head when in the use position without requiring more care to prevent the second inflatable tube from entering within the cavity of the respiratory mask.

Moreover, the invention also deals with respiratory equipment. In accordance with the invention, the respiratory equipment includes:
a respiratory mask having a front side and a rear side (opposite the front side), the respiratory mask comprising a cavity having an opening on the rear side of the respiratory mask, the rear side of the protective mask being adapted to be applied on a user face in a use position in which the user face closes the opening of the cavity,
an inflatable harness adapted to maintain the respiratory mask against the user face,
a storage element comprising a housing adapted to store the respiratory mask at a storage place, and
a strap having a catching portion and a connection portion, said connection portion of the strap being connected to a connection portion of the harness.

Therefore, the harness can be more easily placed in a storage position which reduces the risk of occurrence of inflation problem increasing the time required for inflating the harness.

According to another feature in accordance with the invention, the strap is preferably elastically stretchable.

Thus, exerting a pulling tension on the harness is made easier.

According to the invention, the respiratory equipment has preferably the following features:
the respiratory mask has a top edge and a bottom edge,
the harness is adapted to be placed in an storage position in which an upper resting portion of the harness is placed against the top edge of the respiratory mask,
the respiratory mask comprises a support supporting the respiratory mask, and
the strap has a catching length between the catching portion and the connection portion, said catching length being long enough such that the catching portion of the strap reaches the support when the harness is in the storage position.

Thus, placing the respiratory mask at the storage place while pulling on the strap is made easier, since only one hand is required.

According to the invention, the respiratory equipment has preferably the following features:
the harness comprises an inflatable tube having a first end and a second end connected to the protective mask and forming an harness loop intended to surround the head of the user, and
the connection portion of the strap is connected to a connection portion of the inflatable tube substantially in the middle of the inflatable tube between the first end and the second end.

Thus, a substantially equal pulling tension can be easily exerted over the whole inflatable tube.

According to the invention, the respiratory equipment preferably further has the following features:
the harness comprises a second inflatable tube having a first end and a second end connected to the protective mask and forming a second harness loop intended to surround the head of the user, and
a second connection portion of the strap is connected to a connection portion of the second inflatable tube substantially in the middle of the second inflatable tube between the first end and the second end.

Thus, the harness is more safely maintained on the user head when in the use position without requiring more care to prevent the second inflatable tube from entering within the cavity of the respiratory mask.

BRIEF DESCRIPTION OF THE DRAWINGS

Other features and advantages of the present invention will appear in the following detailed description, with reference to the appended drawings in which.

DETAILED DESCRIPTION OF THE INVENTION

FIG. 1 to FIG. 6 illustrate a respiratory equipment 1 placed in a cabin 9 of an aircraft and essentially comprising a respiratory mask 10, an inflatable harness 20, a storage element 30 and a strap 40.

The respiratory mask 10 shown in FIGS. 1 to 6 is a full face respiratory mask and includes a support 11, an on-demand regulator 12, an oronasal face piece 14 and an eye protective shield 16 fixed to the support 11.

The support 11 is rigid, supports the oronasal face piece 14 and forms a housing containing the on-demand regulator 12. The support 11 includes two opposite gripping surfaces 11a, 11b. In order to hold the respiratory mask 10, the user 8 may pinch the support 11 by pressing on both gripping surfaces 11a, 11b. Gripping surface 11a is part of a lever which can slightly rotate when it is tightly pressed.

Figure 1:
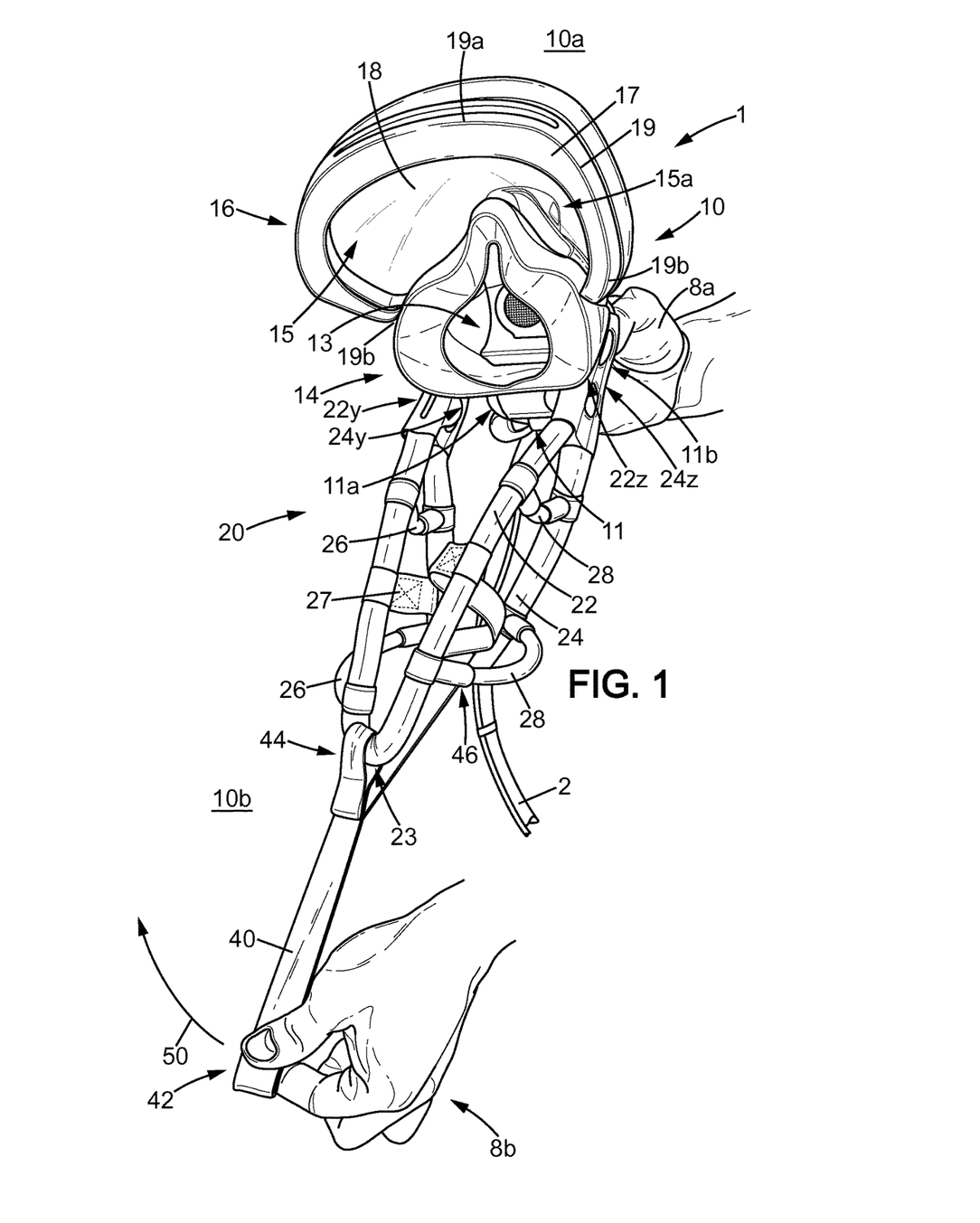
FIG. 1 illustrates in perspective a respiratory equipment at a first step of a storing method in accordance with the invention.
Figure 5:
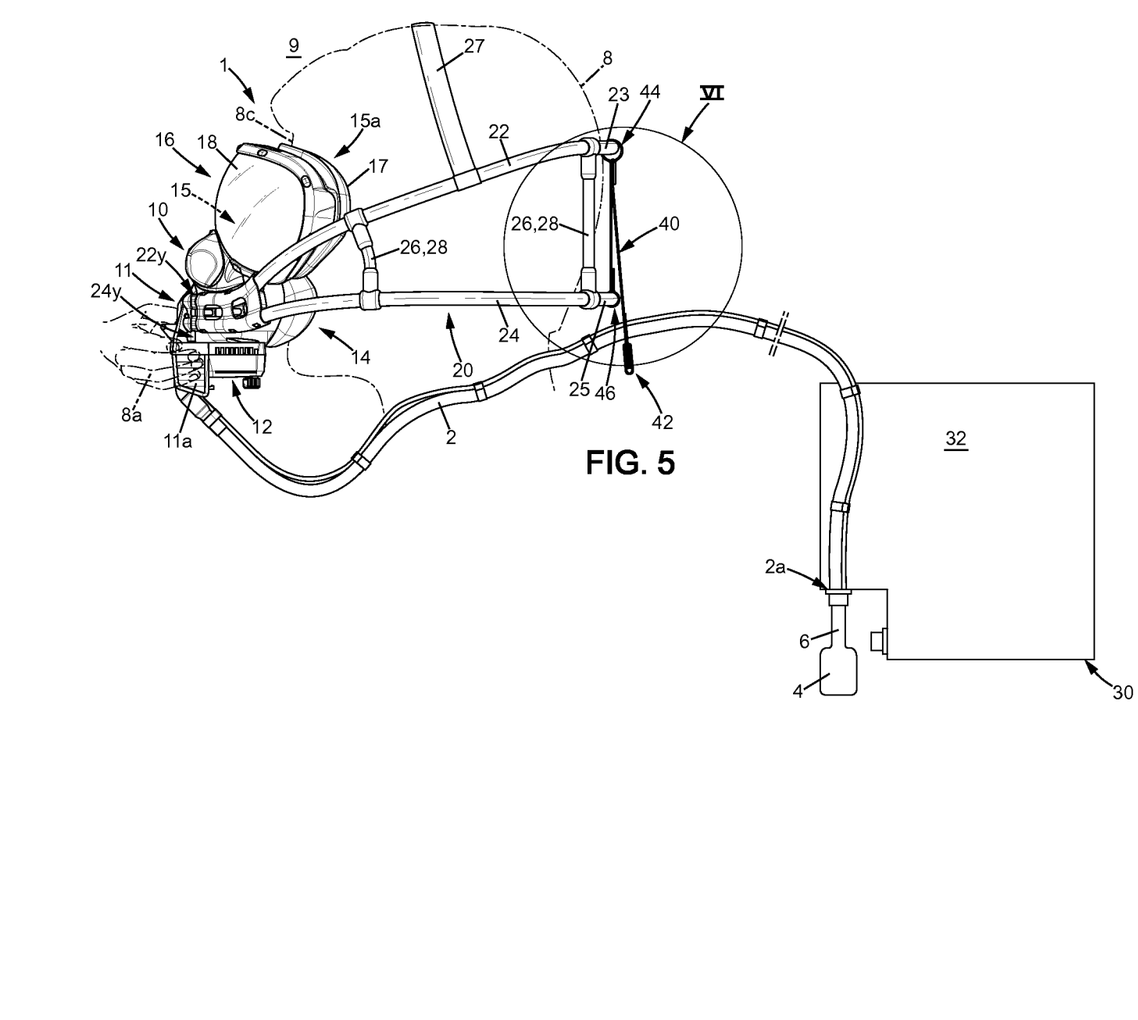
FIG. 5 illustrates the respiratory equipment in a use position.
Figure 6:
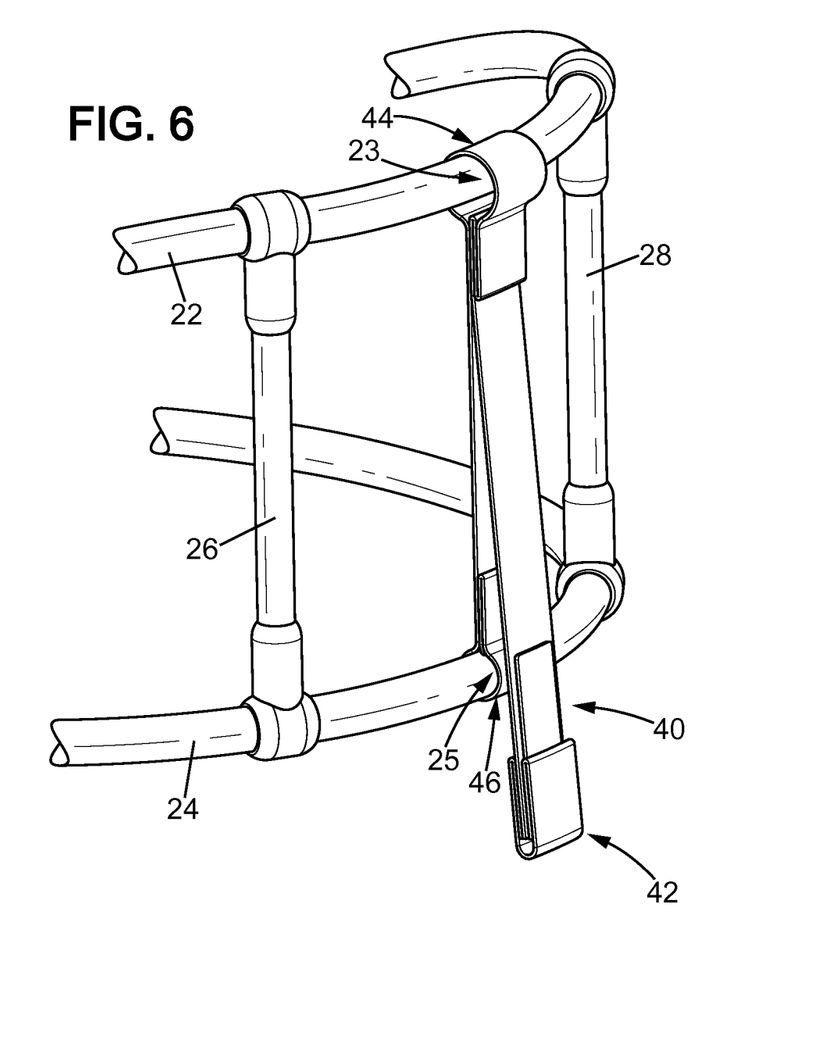
FIG. 6 illustrates at enlarged scale a portion referenced VI in FIG. 5.

As shown in particular in FIGS. 1 and 5, the eye protective shield 16 includes a transparent lens 18 and a peripheral flange 17 having an edge 19 including a top edge portion 19a, a bottom edge portion 19b opposite the top edge portion 19a and side edge portions extending between the top edge portion 19a and the bottom edge 19b.

The respiratory mask 10 has a front side 10a and a rear side opposite the front side 10a. As shown in FIG. 1, the oronasal face piece 14 comprises a cavity 13 having an opening in the rear side 10b of the respiratory mask 10. The eye protective shield 16 comprises a cavity 15 having an opening 15a on the rear side 10b of the respiratory mask 10. The opening 15a is surrounded by the peripheral flange 17. As shown in FIG. 5, the rear side 10b of the respiratory mask 10 is intended to be sealingly applied on a face 8c of a user 8 in a use position. In the use position, the oronasal face piece 14 is sealingly applied on the face 8c of the user 8 around the nose and the mouth of the user 8, so that the user 8 breathes the respiratory gas which is in the cavity 13. Moreover, in the use position, the peripheral flange 17 is applied on the face 8c of the user 8 around the eyes, so that the opening 15a is closed by the face 8c of the user 8. The opening 15a is substantially part of the separation plan extending between the front side 10a and the rear side 10b of the respiratory mask 10.

In the embodiment shown in FIGS. 1 to 6, the cavity 13 of the oronasal face piece 14 and the cavity 15 of the eye protective shield 16 are distinct. But in an alternative embodiment, the cavity 13 of the oronasal face piece 14 and the cavity 15 of the eye protective shield 16 may be put together.

The respiratory equipment 1 further comprises a gas supply tube 2. The gas supply tube 2 is flexible and comprises an upstream end 2a and a downstream end 2b. The gas supply tube 2 is connected at the upstream end 2a to a source of pressurised respiratory gas 4 (in particular oxygen) through a supply line 6. The downstream end 2b of the gas supply tube 2 is connected to the regulator 12, so that the cavity 13 of the oronasal face piece 14 is supplied in respiratory gas through the on-demand regulator 12 in accordance with the requirement of the user breathing.

The harness 20 comprises an upper inflatable tube 22 and a lower inflatable tube 24, each inflatable tube 22, 24 forming a loop having a first end 22y, 24y and a second end 22z, 24z connected to the support 11. As shown in FIG. 5, in the use position each of the upper inflatable tube 22 and the lower inflatable tube 24 surrounds the head of the user 8. The regulator 12 comprises a valve to selectively connect an internal chamber of the inflatable tubes 22, 24 with a source of pressurised gas for inflating the harness 20 upon actuation of the lever including the gripping surface 13a or to the ambient air of the cabin 9 for deflating the harness 20 upon actuation of the lever including the gripping surface 13a upon releasing of the lever including the gripping surface 13a. In the embodiment illustrated, the source of pressurised gas supplying the inflatable tubes 22, 24 is the source of respiratory gas 4 as described for example in WO99/58197. In an alternative embodiment, the inflatable tubes 22, 24 may be supplied in pressurised gas by an autonomous source of pressurised gas as described for example in WO2008/017630.

The harness 20 further comprises non-inflatable elements forming spacers 26, 28, each connected at an upper end to the upper inflatable tube 22, away from the first 22y and second 22z ends of the upper inflatable tube 22 and at a lower end to the lower inflatable tube 24, away from the first 24y and second 24z ends of the lower inflatable tube 24. The spacers 26, 28 are in resilient material, such as rubber or elastomeric material. Preferably, the spacers 26, 28 have a tubular shape of circular section cross section.

The harness 20 further comprises a lateral strap 27 connected at each of its two ends to the upper inflatable tube 22. The lateral strap 27 extends over the head of the user 8 in the use position.

The strap 40 comprises a catching portion 42, a first connection portion 44 connected to a connection portion 23 of the upper inflatable tube 22 and a second connection portion 46 connected to a connection portion 25 of the lower inflatable tube 24. The catching portion 42 forms a free end of the strap 40, the second connection portion 46 forms an opposite free end of the strap 40, and the first catching portion 44 is intermediate between the catching portion 42 and the second connection portion 46 of the strap 40.

Figure 2:
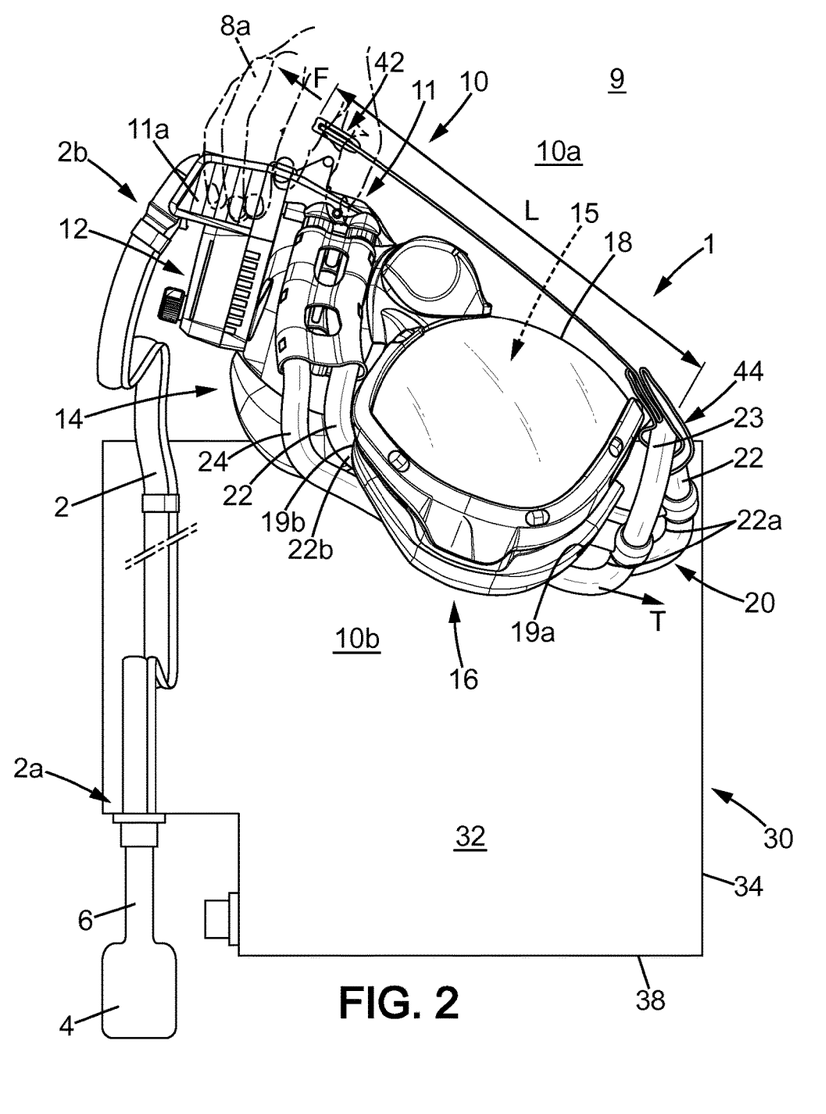
FIG. 2 illustrates in plan view the respiratory equipment having a harness placed in a storage position on a respiratory mask, during insertion in a storage box.

The strap 40 is advantageously elastically stretchable, so that the user 8 may easily exert a tension T on the harness 20 by exerting a pulling force on the catching portion 42 of the strap 40, as illustrated by arrow F in FIG. 2.

The first catching portion 44 is connected to the upper inflatable tube 22 substantially in the middle of the upper inflatable tube 22 between the first 22y and second 22z ends, the connection portion 23 being substantially at the apex of the loop formed by the upper inflatable tube 22. The second catching portion 46 is connected to the lower inflatable tube 24 substantially in the middle of the lower inflatable tube 24 between the first 24y and second 24z ends, the connection portion 25 being substantially at the apex of the loop formed by the lower inflatable tube 22. So, the pulling force F exerted on the strap 40 causes a substantially uniform tension T on both upper 22 and lower 24 inflatable tubes.

The storage element 30 has an internal housing 32 delimited by a back wall 38 and a peripheral wall 34. In the embodiment illustrated in FIGS. 1 to 6, the back wall 38 is intended to rest on the floor of the cabin 9, so the back wall 38 forms the bottom of the housing 32. The housing 32 is in communication with ambient air of the cabin 9 by an opening 36 at the opposite of the back 38.

In order to store the respiratory mask 10 in the storage element 30, as shown in FIG. 1, first the user 8 holds the support 13 with a first hand 8a and pull on the strap 40 with a second hand 8b. So, the user 8 pinches the support 13 with the first hand 8a by pressing the opposite surfaces 11a, 11b on the front side 10a of the respiratory mask 10, pinches the catching portion 42 of the strap on the rear side 10b of the respiratory mask 10 and move his two hands away from each other. Therefore, the user 8 simultaneously pulls on the connection portion 23 of the first inflatable tube 22 and on the connection portion 25 of the second inflatable tube 24 of the respiratory mask 10 away from the respiratory mask 10 and in particular away from the cavities 13 and 15.

Then, the second hand 8b of the user 8 follows a substantially semicircular movement going above the respiratory mask 10 while pulling on the connection portions 23, 25 of the harness 20. Therefore, the user 8 successively pulls on the catching portion 42 of the strap 40 far from the front side 10a, above the top edge 19a and then on the front side 10a close to the support 11.

The strap 40 has a catching length between the catching portion 42 and the connection portion 44 which is long enough to enable placing the catching portion on the support 11 when the harness in the storage position.

So, as shown in FIG. 2, then the user 8 pulls on the catching portion 42 of the strap 40 and holds the support 11 with the same hand 8a. The harness 20 is thus in a storage position in which two upper resting portions 22a of the upper inflatable tube 22 rest on the top edge portion 19a of the eye protective shield 16 and two lower resting portions 22b of the upper inflatable tube 22 rest on the bottom edge portion 19b of the eye protective shield 16.

The user 8 exerts the pulling force F on the strap 40 which causes the tension T exerted on the harness 20 between the upper resting portions 22a and the lower resting portions 22b of the upper inflatable tube 22, therefore preventing the upper inflatable tube 22 from entering into the cavity 15.

Figure 3:
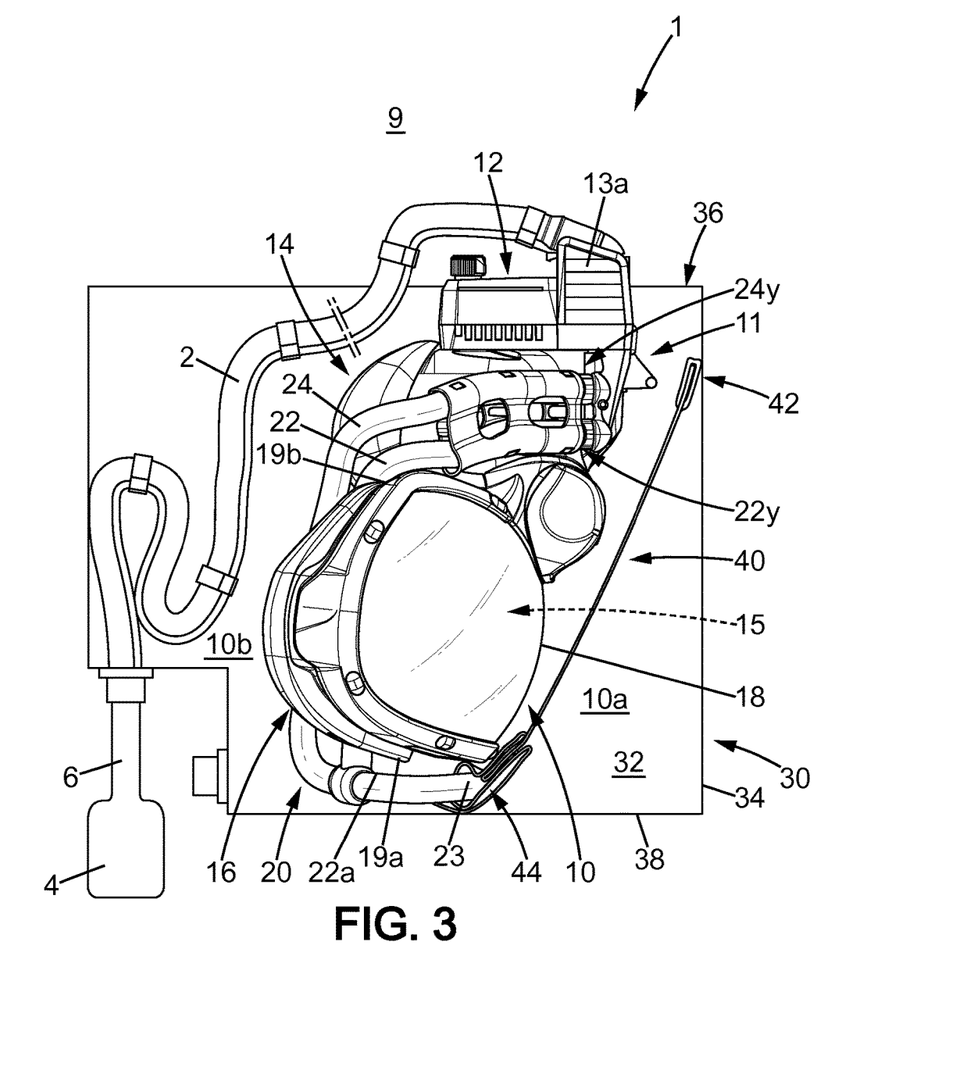
FIG. 3 illustrates the respiratory equipment with the harness placed in the storage position on the respiratory mask and the respiratory mask placed at a storage place in the storage box.

In FIGS. 2 and 3, the resting portion 22a of the upper inflatable tube 22 is shown slightly remote from the top edge 19a of the eye protective shield 16 in order to make the representation more understandable. But in actual fact the upper resting portions 22a of the upper inflatable tube 22 rest on the top edge portion 19a of the eye protective shield 16.

Then, the user 8 inserts the respiratory mask 10 in the housing 32 of the storage element 30 while pulling on the strap 40 for maintaining the harness in the storage position and places the respiratory mask 10 at the storage place as shown in FIG. 3.

In the embodiment shown in FIGS. 1 to 6, the back wall 38 being the bottom wall of the storage element 30, when the respiratory mask 10 is at the storage place, the eye protective shield 16 of the respiratory mask 10 rests on the back wall 38 of the storage element 30 through the resting portions 22a of the upper inflatable tube 22 which is maintained between the top edge 19a of the respiratory mask 10 and the back wall 38.

Then, the user 8 releases the strap 40 and the support 11. As shown in FIG. 3, the respiratory mask 10 is stored in the housing 32 of the storage element 30 at the storage place and the harness is maintained in the storage position on the respiratory mask 10.

In the embodiment shown in FIGS. 1 to 6, the storage element 30 is a storage box having at least one door, preferably two doors hinged between an open position and closed position, to selectively close the opening 36. Preferably, the doors include a notch through which extends the support 11 in the storage position, so that the user may grasp the support 11 of the respiratory mask 10 without opening the doors.

Figure 4:
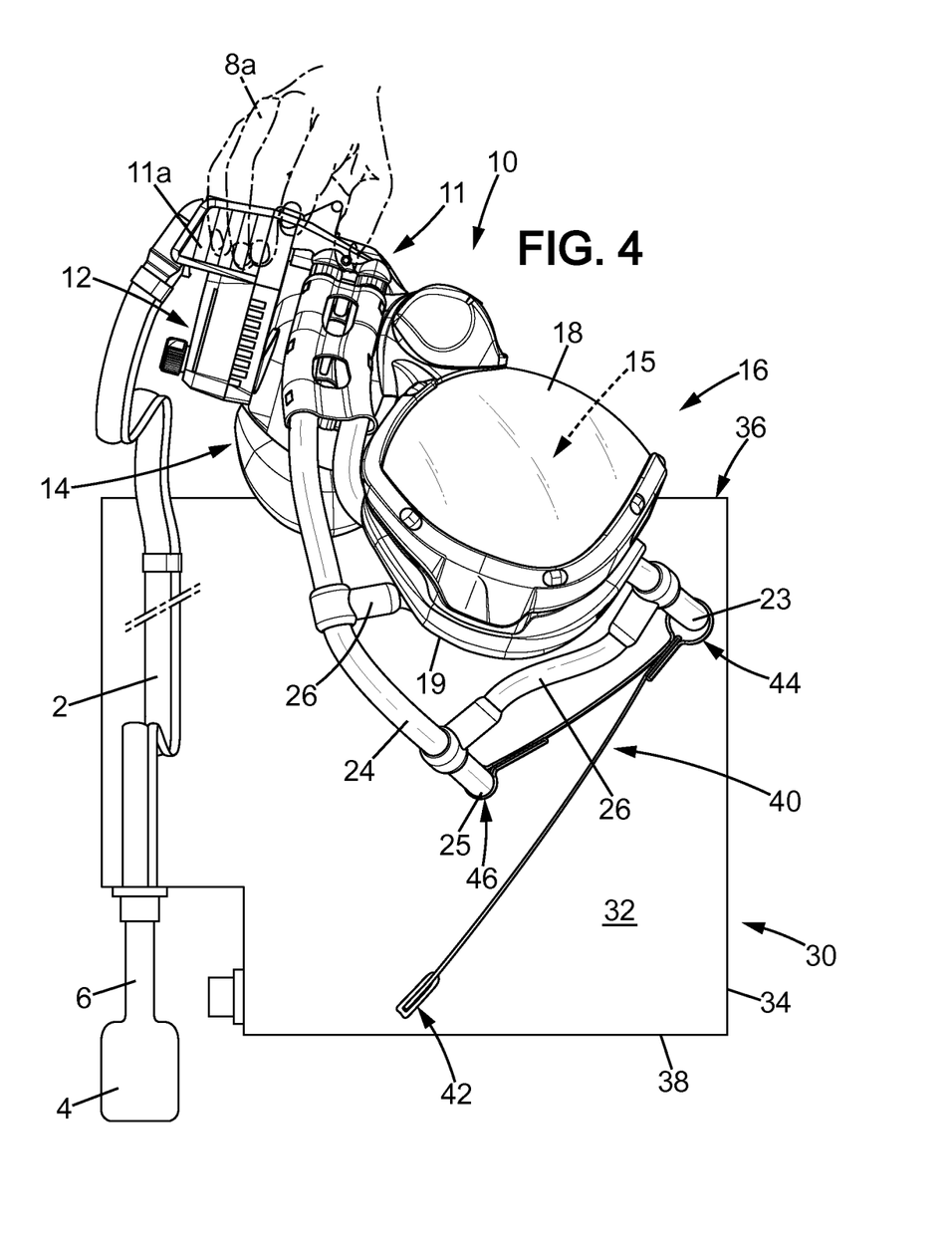
FIG. 4 illustrates the respiratory equipment coming out of the storage box.

When required, the user 8 grasps the respiratory mask 10 by the support 11 and pull the respiratory mask 10 towards him through the opening 36. In the embodiment illustrated, the user 8 rotates the respiratory mask 10 while pulling the respiratory mask 10 towards him as shown in FIG. 4. The harness 20 progressively deploys and falls due to gravity. So, the harness 20 is maintained away from the cavity 15 of the eye protective shield 16.

Then, the user 8 presses the lever the lever including the gripping surface 13a to inflate the harness 20 and then the user applies the respiratory mask 10 on his face 8c, in a use position. In the use position, the whole retaining device 40 is release from the respiratory mask 10.

As shown in FIG. 5, in use position, the strap 40 is still secured to the harness 20, the portion of the strap 40 between the first connection portion 44 and the second connection portion 46 extending opposite the rear of the user head and being slightly tight. The portion of the strap 40 between the first connection portion 44 and the catching portion 42 is hung up from the connection portion 23 of the first inflatable tube 22 outside the portion of the strap 40 between the first connection portion 44 and the second connection portion 46.

Figure 7:
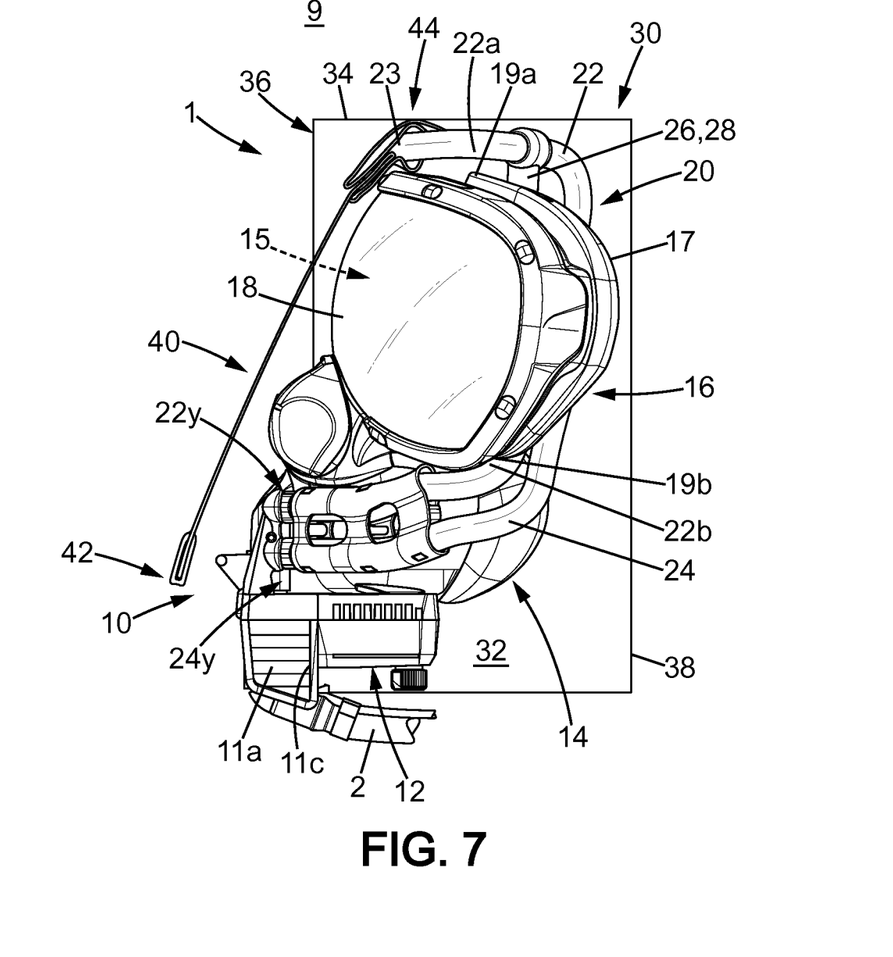
FIG. 7 illustrates a variant of respiratory equipment having the harness placed in the storage position on the respiratory mask and the respiratory mask at a storage place in a storage cup.

The embodiment shown in FIG. 7 differs from the embodiment in FIGS. 1 to 6 in that the storage box is replaced by a storage cup deprived of door and having a the back wall 38 opposite the opening 36 forming a substantially vertical wall.

When the respiratory mask 10 at the storage place shown in FIG. 7, the support 11 is releasably maintained relative to the storage cup 30 thanks to an abutting flange 11c. Otherwise, the harness 20 is in the storage position and the upper resting portion 22a of the harness 20 is maintained between the top edge 19a of the respiratory mask 10 and a top wall 34, of the housing 32 of the storage element 30.

When the user wants to don the respiratory mask, the user pulls therefore the respiratory mask 10 towards him without substantially rotating the respiratory mask 10.

Of course the invention is not limited to the embodiments illustrated for illustrative and not limitative purpose. For example, the strap could be a rope having a substantially circular section instead of a flat and elongated section as the strap shown in the embodiments described above.

The invention claimed is:

1. A method for storing a respiratory mask with an inflatable harness in a storage element, the method comprising:
   a) providing a respiratory equipment including:
      a respiratory mask having a front side and a rear side at the opposite of the front side, the respiratory mask comprises a cavity having an opening in the rear side, the rear side of the respiratory mask being adapted to be applied on a user face in a use position in which the user face closes the opening of the cavity,
      the inflatable harness adapted to maintain the respiratory mask against the user face, and
      the storage element comprising a housing adapted to store the respiratory mask in a storage position,
   b) pulling on the harness on the front side of the respiratory mask in order to place the harness on the respiratory mask in a storage position outside said cavity, and
   c) thereafter continuing to pull on the harness on the front side of the respiratory mask in order to maintain the harness on the respiratory mask in the storage position and inserting the respiratory mask into the housing of the storage element, so as to place the respiratory mask at a storage place of the storage element.

2. The method according to claim 1 comprising:
   providing the respiratory mask with a top edge and a bottom edge around the cavity, the bottom edge being opposite the top edge, and
   placing an upper resting portion of the harness against the top edge of the respiratory mask in the storage position during step b).

3. The method according to claim 2 comprising maintaining the upper resting portion of the harness between the top edge of the respiratory mask and a wall of the housing of the storage element when the respiratory mask is at the storage place.

4. Method for storing a respiratory mask with an inflatable harness in a storage element, the method comprising:
   a) providing a respiratory equipment including:
      a respiratory mask having a front side and a rear side at the opposite of the front side, the respiratory mask comprises a cavity having an opening in the rear side, the rear side of the respiratory mask being adapted to be applied on a user face in a use position in which the user face closes the opening of the cavity,
      the inflatable harness adapted to maintain the respiratory mask against the user face, and
      the storage element comprising a housing adapted to store the respiratory mask in a storage position,
   b) pulling on the harness on the front side of the respiratory mask and providing the respiratory mask with a top edge and a bottom edge around the cavity, the bottom edge being opposite the top edge, and placing an upper resting portion of the harness against the top edge of the respiratory mask in order to place the harness on the respiratory mask in a storage position outside said cavity, and placing a lower resting portion of the harness against the bottom edge of the respiratory mask and exerting a tension on the harness between the upper resting portion and the lower resting portion in the storage position of the respiratory mask, and
   c) maintaining the harness on the respiratory mask in the storage position and inserting the respiratory mask into the housing of the storage element, so as to place the respiratory mask at a storage place of the storage.

5. The method according to claim 2, comprising pulling on a connection portion of the harness away from the cavity on the back side of the respiratory mask, and then in a substantially circular movement pulling on the connection portion of the harness successively:
   above the top edge, and
   on the front side of the respiratory mask, so as to place the upper resting portion of the harness against the top edge of the respiratory mask.

6. Respiratory equipment including:
   a respiratory mask having a front side and a rear side, the respiratory mask comprising a cavity having an opening on the rear side of the respiratory mask, the rear side of the respiratory mask being adapted to be applied on a user face in a use position in which the user face closes the opening of the cavity, the respiratory mask further has a top edge and a bottom edge and comprises a support,
   an inflatable harness adapted to maintain the respiratory mask against the user face, the harness being adapted to be placed in a storage position in which an upper resting portion of the harness is placed against the top edge of the respiratory mask, and
   a storage element comprising a housing adapted to store the respiratory mask at a storage place,
   wherein the respiratory equipment further includes a strap having a catching portion and a connection portion, said connection portion of the strap being connected to a connection portion of the harness, the strap has a catching length between the catching portion and the connection portion, said catching length being long enough such that the catching portion of the strap reaches the support when the harness is in the storage position.

7. The respiratory equipment according to claim 6 wherein the strap is elastically stretchable.

8. The respiratory equipment according to claim 6 wherein:
   the harness comprises an inflatable tube having a first end and a second end connected to the protective mask and forming a harness loop intended to surround the head of the user, and
   the connection portion of the strap is connected to a connection portion of the inflatable tube substantially in the middle of the inflatable tube between the first end and the second end.

9. The respiratory equipment according to the claim 8 wherein:
   the harness comprises a second inflatable tube having a first end and a second end connected to the protective mask and forming a second harness loop intended to surround the head of the user, and
   a second connection portion of the strap is connected to a connection portion of the second inflatable tube substantially in the middle of the second inflatable tube between the first end and the second end.

10. Method for storing a respiratory mask with an inflatable harness in a storage element, the method comprising:
    a) providing a respiratory equipment including:
       a respiratory mask having a front side and a rear side at the opposite of the front side, the respiratory mask comprises a cavity having an opening in the rear side, the rear side of the respiratory mask being adapted to be applied on a user face in a use position in which the user face closes the opening of the cavity, an inflatable harness adapted to maintain the respiratory mask against the user face,
a strap having a catching portion and a connection portion, said connection portion of the strap being connected to the harness, and
a storage element comprising a housing adapted to store the respiratory mask in a storage position,
b) pulling on the catching portion of the strap on the front side of the respiratory mask in order to place the harness on the respiratory mask in a storage position outside said cavity, and
c) maintaining the harness on the respiratory mask in the storage position and inserting the respiratory mask into the housing of the storage element, so as to place the respiratory mask at a storage place of the storage element.

11. The method according to claim 10 comprising:
releasing the strap after inserting the respiratory mask into the storage element and placing the respiratory mask in the storage place of the storage element.

12. The method according to claim 10 comprising:
providing the respiratory mask with a support supporting the respiratory mask, and
during step c) gripping the support and catching the catching portion of the strap with a single hand.

13. The method according to claim 11 comprising fixing the respiratory mask at the storage place before releasing the strap.

14. The method according to claim 10 wherein the strap is elastically stretchable.

15. The method according to claim 10 comprising:
providing the harness with an inflatable tube having two ends connected to the respiratory mask and forming an harness loop intended to surround the head of the user, and
connecting the connection portion of the strap to the inflatable tube substantially in the middle of the inflatable tube between the first end and the second end.

16. The method according to claim 15 comprising:
providing the harness with a second inflatable tube having two ends connected to the respiratory mask and forming a second harness loop intended to surround the head of the user,
connecting a second connection portion of the strap to the second inflatable tube substantially in the middle of the second inflatable tube between the first end and the second end, and
simultaneously pulling on the inflatable tube and the second inflatable tube during step b).

\* \* \* \* \*